United States Patent [19]
Friedrich et al.

[11] Patent Number: 5,390,183
[45] Date of Patent: Feb. 14, 1995

[54] PCM PSEUDO CODE SIGNALLING USER INTERFACE

[75] Inventors: Walter R. Friedrich, Pleasanton; David C. Brief, Palo Alto, both of Calif.

[73] Assignee: National Semiconductor Corporation, Santa Clara, Calif.

[21] Appl. No.: 988,245

[22] Filed: Dec. 9, 1992

[51] Int. Cl.$^6$ .......................... H04J 3/02; H04L 12/42
[52] U.S. Cl. .................... 370/85.15; 370/15; 370/110.1
[58] Field of Search ............... 370/85.1–85.5, 370/85.12, 85.14–85.15, 60, 60.1, 68.1, 94.1, 94.2, 94.3, 110.1, 15; 340/825.05, 825.06, 825.3; 395/200

[56] References Cited

U.S. PATENT DOCUMENTS

| | | | |
|---|---|---|---|
| 5,031,174 | 7/1991 | Natsume | 370/85.5 |
| 5,046,182 | 9/1991 | Hamstra et al. | 370/85.5 |
| 5,182,747 | 1/1993 | Frenzel, III et al. | 370/85.15 |

FOREIGN PATENT DOCUMENTS

| | | |
|---|---|---|
| 0432428A2 | 6/1991 | European Pat. Off. |
| 0459756A2 | 12/1991 | European Pat. Off. |
| 0463528A2 | 1/1992 | European Pat. Off. |

OTHER PUBLICATIONS

MC68837—FDDI Elasticity Buffer and Link Manager Preliminary Specification.
Excerpt from an Advanced Micro Devices Databook.

Primary Examiner—Douglas W. Olms
Assistant Examiner—Hassan Kizou
Attorney, Agent, or Firm—Hickman & Beyer

[57] ABSTRACT

A controllable physical connection management (PCM) pseudo code user interface is disclosed for use in the physical layer controller of a station or concentrator that is capable of insertion into a data transmission network that is capable of operating substantially in accordance with the FDDI protocol. In one aspect of the invention, the interface permits the user to direct the PCM state machine to pause after entering the Next state after the transmission of any pseudo code signalling bit. In another aspect of the invention, the interface permits a user to load a hardware register with the pseudo code signalling information to be transmitted before the signalling begins. However, Complete control of the pseudo code signalling is retained by the user during the signalling process to permit midstream changes in the pseudo code sequence to protect against communications with unexpected neighboring port configurations and to permit custom pseudo code signalling sequences.

30 Claims, 9 Drawing Sheets

|  D7  |  D6  |  D5  |  D4 ↓33 |  D3  |  D2  |  D1  |  D0  |
|------|------|------|------|------|------|------|------|
| IB7  | IB6  | IB5  | IB4  | IB3  | IB2  | IB1  | IB0  |

| D15  | D14  | D13  | D12  | D11  | D10  | D9   | D8   |
|------|------|------|------|------|------|------|------|
| IB15 | IB14 | IB13 | IB12 | IB11 | IB10 | IB9  | IB8  | ←34

Fig. 13

|  D7  |  D6  |  D5  |  D4 ↓35 |  D3  |  D2  |  D1  |  D0  |
|------|------|------|------|------|------|------|------|
| T7   | T6   | T5   | T4   | T3   | T2   | T1   | T0   |

| D15  | D14  | D13  | D12  | D11  | D10  | D9   | D8   |
|------|------|------|------|------|------|------|------|
| T15  | T14  | T13  | T12  | T11  | T10  | T9   | T8   | ←36

Fig. 14

|  D7  |  D6  |  D5  |  D4 ↓38 |  D3  |  D2  |  D1  |  D0  |
|------|------|------|------|------|------|------|------|
| R7   | R6   | R5   | R4   | R3   | R2   | R1   | R0   |

| D15  | D14  | D13  | D12  | D11  | D10  | D9   | D8   |
|------|------|------|------|------|------|------|------|
| R15  | R14  | R13  | R12  | R11  | R10  | R9   | R8   | ←39

Fig. 15

PCM PSEUDO CODE SIGNALLING USER INTERFACE

BACKGROUND OF THE INVENTION

This application is related to co-pending application Ser. No. 07/988,246 filed Dec. 9, 1992, which is assigned to the assignee of the present application and which is incorporated herein by referent.

1. I. Field of the Invention

The present invention relates generally to management of the initial communication between a pair of nodes in a data transmission network prior to the insertion of a station into the data transmission ring. More particularly, a user interface is provided that permits the user to control the pseudo code signaling that occurs during the connection management sequence.

2. Discussion of the Prior Art

One type of high speed data transmission network is defined by the Fiber Distributed Data Interface (FDDI) protocol. The FDDI protocol is an American National Standards Institute (ANSI) data transmission standard which applies to a 100 Mbit/second token ring network that utilizes an optical fiber transmission medium. The FDDI protocol is intended as a high performance interconnection between a number of computers as well as between the computers and their associated mass storage subsystem(s) and other peripheral equipment.

Information is transmitted on an FDDI ring in frames that consist of 5-bit characters or "symbols", each symbol representing 4 data bits. Information is typically transmitted in symbol pairs or "bytes". Tokens are used to signify the right to transmit data between stations. The FDDI standard includes a thirty-two member symbol set. Within the set, sixteen symbols are data symbols (each representing 4 bits of ordinary data) and eight are control symbols. The eight control symbols are: J (the first symbol of a start delimiter byte JK), K (the second symbol of a start delimiter byte JK). I (Idle), H (Halt), Q (Quiet), T (End Delimiter), S (Set) and R (Reset). The remaining eight symbols of the FDDI standard symbols set are not used since they violate code run length and DC balance requirements of the protocol. These are referred to as V (violation) symbols.

In operation, a continuous stream of control symbol patterns defines a "line state". The FDDI protocol defines several line states, which include the following line states that are used during the connection management sequence:

(1) Idle Line State (ILS), which is a continuous stream of Idle symbols;
(2) Quiet Line Sate (QLS),which is a continuous stream of Quiet symbols;
(3) Halt Line State (HLS), which is a continuous stream of Halt symbols;
(4) Master Line State (MLS), which is an alternating stream of Halt and Quiet symbols; and
(5) Active Line State (ALS), which is the state used to transmit data units (frames)

The FDDI Station Management (SMT) standard provides the necessary control of an FDDI station (node) so that the node may work cooperatively as a part of an FDDI network. To effectively implement the functions required. SMT is divided into three entities, namely the Connection Management entity (CMT), the Ring Management entity (RMT) and the Frame Based Services. The Connection Management (CMT) is the management entity in the Station Management that is responsible for the station's port(s), as well as the connection to the ports of neighboring stations.

The Connection Management is further divided into three sub-entities. They include, the Physical Connection Management (PCM), Configuration Management (CFM) and Entity Coordination Management (ECM).

The introduction of an FDDI station (node) into the data flow path of the FDDI ring is governed by the Physical Connection Management (PCM) entity. To accomplish this, the PCM initializes the connection to neighboring ports and manages the line state signalling. Therefore, the PCM provides all of the necessary signalling to initialize a connection, to withhold a connection on a marginal line and to support maintenance. One of the most important functions of PCM is to establish a connection between two neighboring ports that are directly connected. In order to manage the initial connection between the ports of separate stations, the PCM manages the physical layer, controls the line-states transmitted during initiation and monitors the line-states received during the connection initialization. The PCM block itself is generically subdivided into two entities. The PCM state machine and the PCM pseudo code. The PCM state machine contains all the state and timing information of the PCM and provides a signalling channel. The PCM pseudo code specifies the pseudo code bits that are to be signalled by the PCM state machine and processes the bits received from the PCM at the other end of the link.

The connection process is achieved through a lock-step handshaking procedure. In the basic FDDI sequence, the handshaking procedure controlled by the PCM is divided into three stages. They include an initialization sequence, a signaling sequence and a join sequence. The initialization sequence is used to indicate the beginning of the PCM handshaking process. It forces the neighboring PCM into a known state so that the two PCM state machines can run in a lock-step fashion.

Following the initialization sequence is the signaling sequence. The signaling sequence communicates basic information about the port and he node with the neighboring port. A Link Confidence Test (LCT) is also conducted during the signaling sequence to test the link quality between the two ports. If the link quality is not acceptable or the type of connection is not supported or is currently not accepted by the nodes then the connection will be withheld. If the connection is not withheld during the signaling sequence, the PCM state machine can move on to the join sequence and establish a connection between the two neighboring ports.

A general description of the Station Management standard, as well as each of its subparts, including the PCM is described in detail in the draft ANSI FDDI Station Management Standard, dated Jun. 25, 1992, which is incorporated herein by reference.

The basic FDDI protocol has a defined connection management sequence for making a duplex connection between a pair of stations. As seen in FIG. 1, the PCM State Machine is likely to enter a total of seven states during the connection sequence. These include the following states: PC1:Break; PC3:Connect; PC4:Next; PC5:Signal; PC6:Join; PC7:Verify; and PC8:Active.

The PCM pseudo code machine is started in the Next state. The Next state is one of the two states used in the signaling sequence. The main purpose of the Next state is to separate the "bit" signaling performed in the Signal state (PC5). The Next state is also used to transmit Protocol Data Units (PDUs) while a loop test such as a Link Confidence Test or optionally, a Media Access Control Layer (MAC) Local Loop Test is performed.

On initial entry into the Next state, a continuous stream of Idle symbols is transmitted. While in the Next state, either a continuous stream of Idle symbols or a PDU symbol stream is transmitted. The Next state terminates and the state machine transits to the Signal state (PC5) upon the reception of either a Halt or a Master line state after a loop is performed. The same transition is made when a PC_Signal signal is received from the Pseudo Code machine. When a PC_Join signal is received, a transition is made to the Join state.

The Signal state is the second state used in the pseudo code signaling sequence. In the Signal state, individual bits of information are communicated between ports by transmitting either Halt symbols or Master symbols. The transmission of a Halt line state is equated with a logical one, and the transmission of the Master line state is a logical zero. Once each individual bit has been transmitted and received, the state machine returns to the Next state (i.e. the transmission of the Idle line state), before returning to the Signal state to transmit the next bit of information. Thus, the Next state is used as a bit delimiter between two signaling bits. When all signal bits have been transmitted and received, the Signaling sequence ends.

The pseudo code information that is transmitted as the state machine moves back and forth between the Next and Signal states is used by each station to provide information necessary to the connection process such as the port type and compatibility, the duration and results of the link confidence test and various information about the availability of the MAC for various purposes. The meaning of each bit is further explained in the proposed FDDI Station Management Standard referenced above.

The basic FDDI protocol (referred to as FDDI-1) has a defined connection management sequence as seen in FIG. 2a. The ANSI standards committee is currently working on an enhanced version of FDDI, which is generally referred to as the FDDI-II standard. At the time of this writing, the connection management sequence for FDDI-II had not been finalized. However, there are several proposed connection management sequences for FDDI-II. One such proposed sequence for a duplex connection is shown in FIG. 2b. As seen therein, it is expected that the sequence will be generally similar schematically to the protocol for a FDDI-I connection. Similarly, the state machine for a FDDI-II duplex connection is expected to be essentially the same as he state machine for a basic FDDI-1 connection. However, the information carried in the various pseudo code bits is expected to be somewhat different.

Since FDDI standards have not yet been finalized, and indeed are likely to be subject to change for some time, it is desirable for system designers to have a single chip set that can not only accommodate each of these different connection management sequences, but also remains adaptable to accommodate emerging FDDI standards and specialized user requirements.

SUMMARY OF THE INVENTION

To achieve the foregoing and other objects and in accordance with the purpose of the present invention, a physical layer controller is disclosed for controlling the physical layer of a station that is capable of insertion into a data transmission network that is capable of operating substantially in accordance with the FDDI protocol. The physical layer controller includes a physical connection management entity that is capable of executing a connection management sequence in accordance with the FDDI protocol. The physical layer includes a plurality of registers that constitute a variety of aspects of the present invention.

In a first aspect of the invention, a state register is provided that a user may selectively write into in order to designate a new pseudo code bit that the physical layer controller should transmit. When a value indicative of a desired new pseudo code bit location is written into the state register, the physical layer controller will automatically transmit the desired new pseudo code bit as the next pseudo code signalling bit.

In a second aspect of the invention, a pseudo code pause register that may be selectively written into by the user is provided. The pseudo code pause register indicates the location(s) within the pseudo code signalling sequence that the PCM state machine should be paused in. When the pseudo code signalling sequence reaches the pause location indicated by the pseudo code pause register, the PCM state machine will automatically pause in that location.

In a third aspect of the invention, a pseudo code register is provided that the user may selectively write into in order to specify the number of pseudo code bits to be signalled during the pseudo code signalling sequence.

In a forth aspect of the invention, a transmit register is provided. The transmit register contains the pseudo code signalling bits to be transmitted during the pseudo code signalling sequence. The transmit register is arranged such that the user may selectively write the desired pseudo code information into the transmit register.

In a fifth aspect of the invention, a receive register is provided. The receive register contains the pseudo code signalling bits that the physical layer controller expects to receive during the connection management sequence from a neighboring port. Additionally, logic is provided for detecting a mismatch between the pseudo code signalling bits actually received from the neighboring port and the expected pseudo code signaling bits. In various preferred embodiments of the invention these aspects are utilized in combination.

In a method aspect of the invention, a method of initializing a connection between two stations in a data transmission network that operates substantially in compliance with the FDDI protocol is disclosed. The method includes the steps of transmitting a pseudo code signalling bit to an adjoining station and receiving a corresponding pseudo code signalling bit from the adjoining station. After a signalling bit has been transmitted, a check is made to determine whether a pseudo code pause has been requested by the user after the transmission of that particular pseudo code signalling bit. If so, a pseudo code pause is initiated in the Next state that occurs between pseudo! code signalling bits. Thereafter, a check is made to determine whether additional pseudo code signal bits are to be transmitted and the aforementioned steps are repeated until all of the pseudo code signaling bits have been transmitted.

In another method aspect of the invention, the value of the received signalling bit is compared to an expected value for that pseudo code signalling bit, whereby when the actual value of the pseudo code signal bit received does not correspond to the expected value, a pseudo code pause is initiated and a request is made for assistance from user software.

In a preferred embodiment anytime that a pseudo code pause is initiated, a pseudo code pause flag is raised. Additionally, a value is written into a pause reason indicator portion of a status register that is indicative of cause of the pseudo code pause.

BRIEF DESCRIPTION OF THE DRAWINGS

The invention, together with further objects and advantages thereof, may best be understood by reference to the following description taken in conjunction with the accompanying drawings in which:

FIG. 13 is a diagram illustrating the contents ;of the Pseudo Code Pause Registers.

FIG. 14 is a diagram illustrating the contents of the Transmit Registers.

FIG. 15 is a diagram illustrating the contents of the Receive Registers.

DETAILED DESCRIPTION OF THE INVENTION

Figure 3:
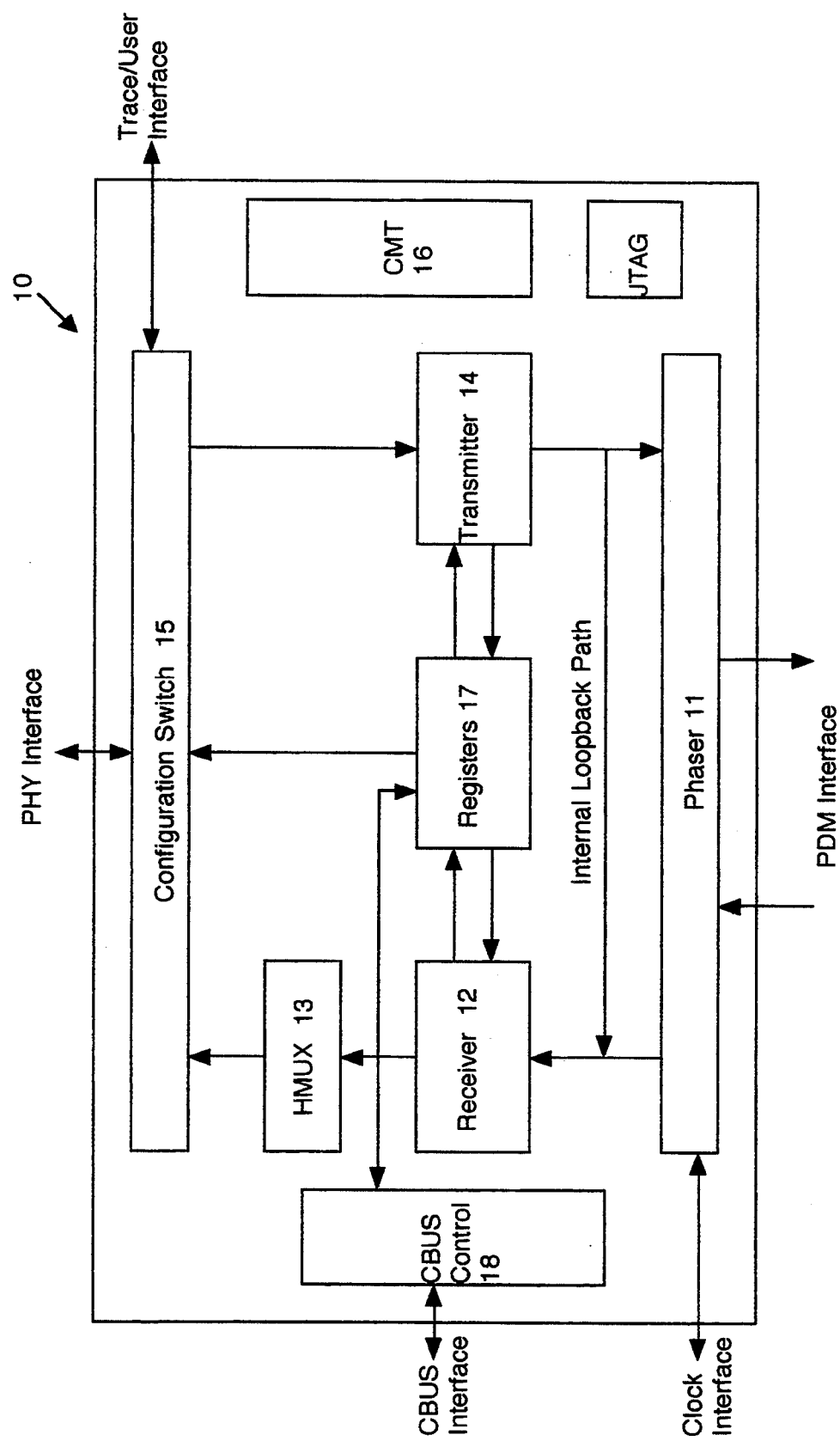
FIG. 3 is a block diagram of a Physical Layer Controller.

FIG. 3 shows a block diagram of a Physical Layer Controller (PLAYER TM) 10 which implements the physical function as defined by the Fiber Distributed Data Interface (FDDI) protocol (ANSI X3T9.5). The Physical Layer Controller 10 has several primary blocks including: a phaser 11, a receiver 12, a hybrid Multiplexor (HMUX) 13, a transmitter 14, a configuration switch 15, connection management (CMT) 16, a multiplicity of storage registers 17 and a control bus interface 18.

The phaser 11 accepts a serial binary 125 MBit/sec Non-Return-To-Zero-Invert-On-Ones (NRZI) data stream from an external source, through a serial channel that connects with the FDDI network fiber optic transmission medium. The phaser 11 establishes the 5-bit symbol boundaries for the serial bit stream and synchronizes the upstream station's clock to the local clocks of the Physical Layer Controller 10.

The receiver 12 accepts serial binary information from either the phaser 11 or from the transmitter 14 via one of two internal loopback paths. When necessary, the receiver 12 converts the information stream from the (NRZI) format utilized on the FDDI medium to Non-Return-To-Zero (NRZ) format used internally by the receiving station and decodes the NRZ data from external 5B coding to internal 4B coding. The receiver 12 also performs line state detection, link error detection and presents the data to the configuration switch 15 as internally coded symbol pairs.

The hybrid multiplexor 13 performs the functions of an HMUX as defined in the ANSI X3T9.5 Hybrid Ring Control Draft Proposed American National Standard. Therefore, the HMUX processes received cycles and ;determines where the information within a received cycle should be sent.

The transmitter 14 accepts information characters as symbol pairs from the internal 4B coding to the external 5B coding, filters out code violations in the information stream and redistributes Idle bytes which were added or deleted by the elasticity buffer. In addition, the transmitter 14 is capable of generating Idle, Master, Halt, Quiet or other user defined symbols. The transmitter 14 also converts the information stream from NRZ to NRZI and presents it to either the receiver 12 via one of the internal loopback paths or to the FDDI fiber optic medium as a serial bit stream.

The primary function of the configuration switch 15 is to route the information flow to support multiple station configurations for different station types without external logic. The control bus interface 18 allows the user to program the configuration switch 15, to enable and disable functions within the receiver 12 and the transmitter 14, to report line states and link errors detected by the receiver 12 and to report error conditions.

Figure 4:
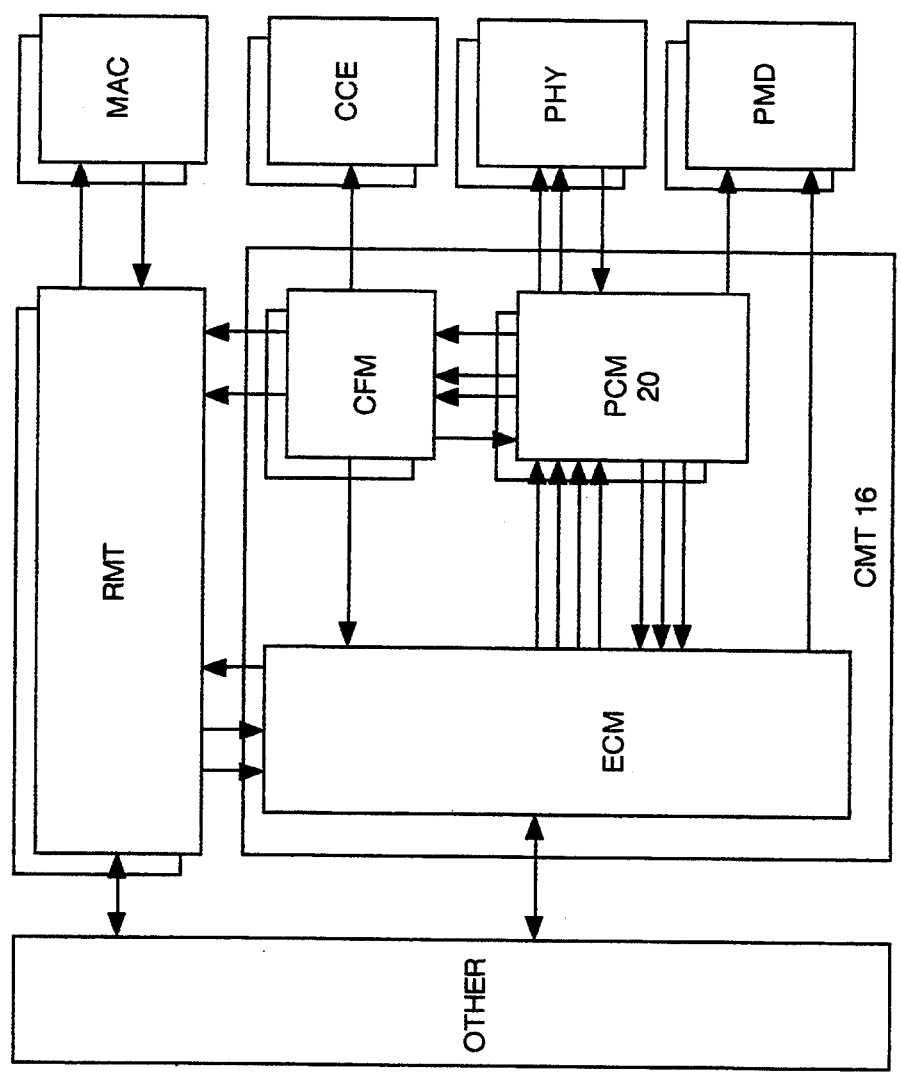
FIG. 4 is a block diagram of the Connection Management Structure within the Physical Layer Controller.

Referring next to FIG. 4, the Connection Management entity (CMT) 16 will be briefly described. In accordance with the FDDI protocol, the CMT 16 includes an Entity Coordination Management entity (ECM), a plurality of Physical Connection Management entities (PCM) and a plurality of Configuration Management entities (CFM). Within the FDDI protocol, one PCM is provided for each port, while one CFM is provided for each resource (port or MAC).

The Connection Management entity 16 communicates with a variety of other entities within the station, including the Ring Management (RMT), the Configuration Control Element (CCE), the Physical Layer (PHY), the Physical Medium Dependent layer (PMD) and others. A more detailed explanation of the interrelationship of these entities is set forth in the previously cited ANSI FDDI Station Management Standard. However, since these relationships are not particularly relevant to the present invention, they will not be described herein.

A number of data registers 17 are provided to facilitate the control and operation of the Physical Layer Controller 10. Each data register 17 includes 8 or 16 bits that store information about the system. Most of the registers are not directly related to the operation of the PCM and many of the registers relating to the PCM are not directly relevant to the present invention. Further, the actual significance of the contents of the registers may vary a great deal depending upon the desired features of the Physical Layer. Therefore, only the registers (and segments thereof) that are relevant to the present invention will be described herein.

The data registers 17 include a Control register 23, a Pseudo Code register 24, a Time register 25, a Condition register 27, a Condition Mask register 28, a Status register 29, a State register 31, a pair of Pseudo Code Pause registers 33, a pair of Transmit registers 35,36 and a pair of Receive registers 38,39.

In the described embodiment, up to 16 bits of pseudo code signaling information, as well as one loop, can be performed while establishing a duplex connection using the physical layer controller 10 alone and without requiring any software interference. On the other hand, the PCM state machine can be paused during the pseudo code signalling thereby allowing the user to interact with the signalling when desired. Thus, if necessary, the user can provide all the intelligence required during the pseudo code sequence. The pseudo code pause mechanism forces the state machine to pause in the Next state and remain paused until released or an error condition is detected.

Figure 1:
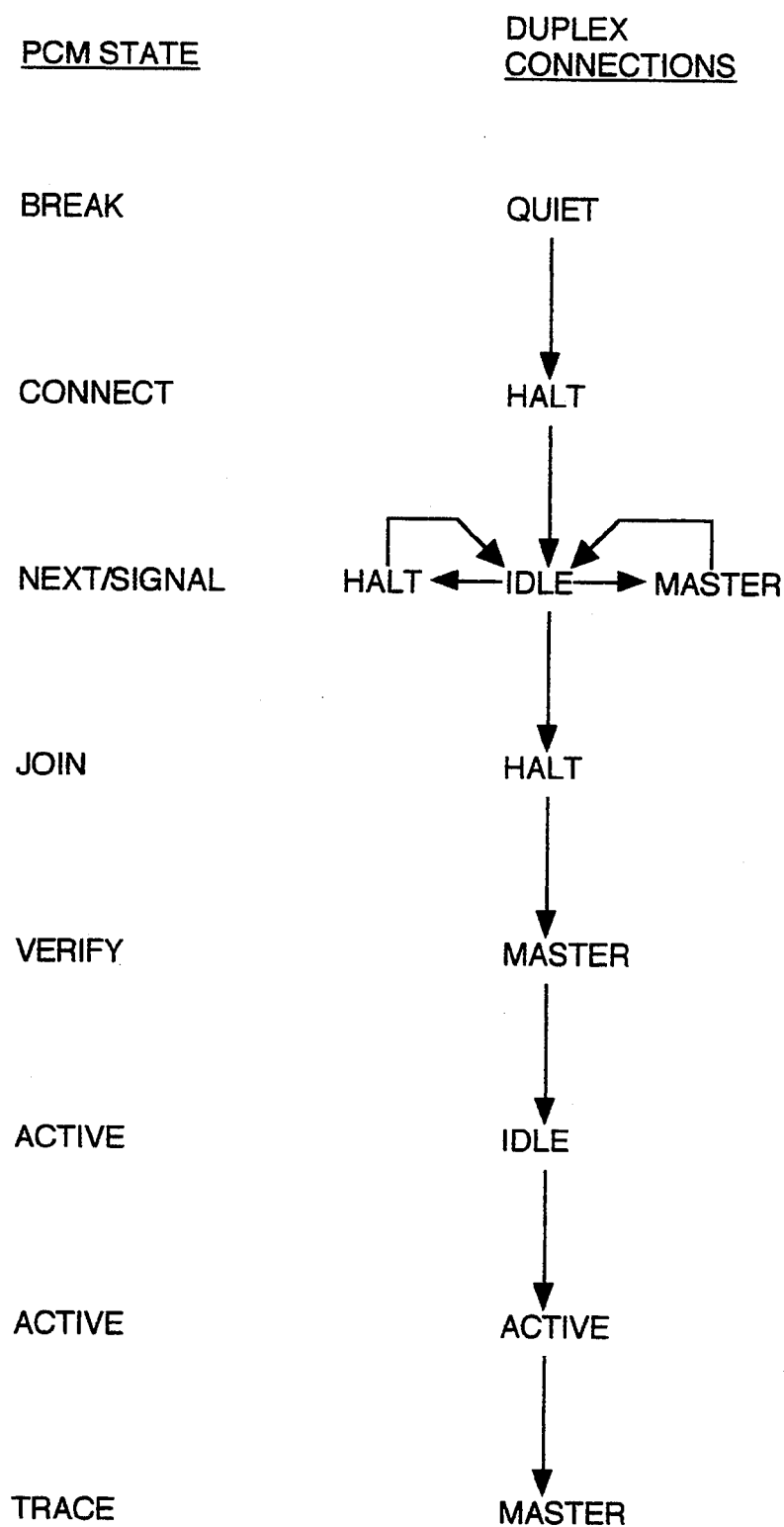
FIG. 1 is a flow diagram showing the PCM states encountered when initiating a station connection.
Figure 2A:
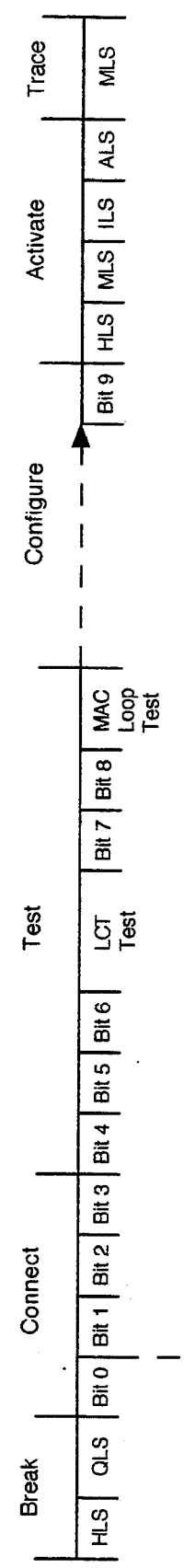
FIGS. 2a and 2b are representative connection sequences for FDDI-I and FDDI-II Duplex connections.
Figure 2B:
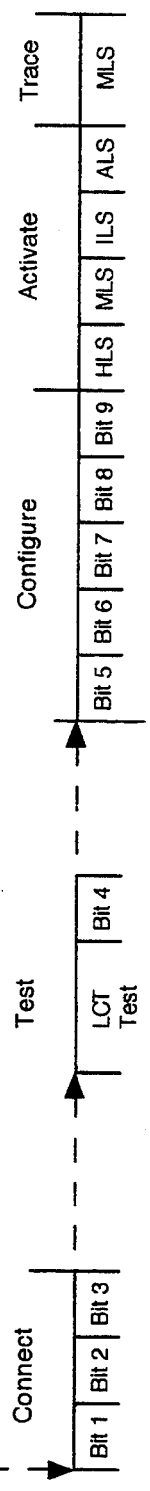

As seen in FIG. 2a, the FDDI-I protocol uses a pseudo code sequence of just ten bits (i.e. Bit 0–Bit 9). The protocol includes the facility to perform two tests. That is, the Link Confidence test and the MAC Loop test. However, in practice, it appears that only a small percentage of the actual FDDI compatible systems will incorporate the MAC Loop test. Therefore, it is expected that in most cases, the described physical layer controller will be capable of transmitting and receiving the required pseudo code information without resorting to software or other user control during the signalling portion of the connection management sequence.

The pseudo code signalling bit values actually received are compared to expected values stored in Receive registers 38,39 as they are received. If a mismatch occurs, control of the pseudo code is given at least temporarily to the user, which would typically take the form of software intervention. When no mismatch is detected, the signaling proceeds without interruption. In such cases, the PCM state machine transmits the information stored in the Transmit register 35. In practice, it is expected that the pseudo code sequence will only vary in cases where the adjoining station undergoes a change, such as would occur when the loop wiring is reconfigured or the internal station resources of the adjoining station are changed, such as might occur when stations are reconfigured or replaced. The pseudo code would also vary in the event of link degradation, which could cause the Link Confidence Test to fail. It is expected that in actual practice, such events would occur very seldomly, which means that the vast majority of the time, the initial connection would be conducted without requiring any software interference.

Figure 5:
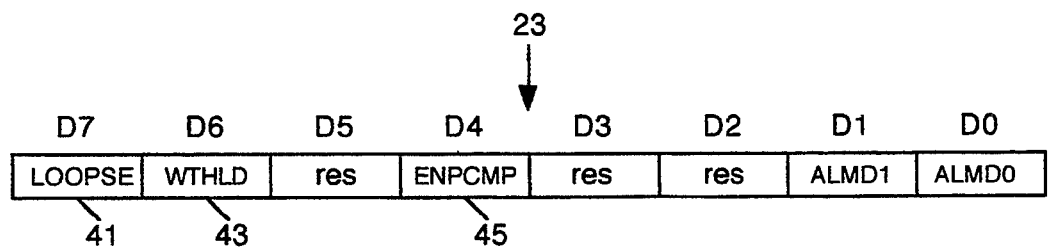
FIG. 5 is a diagram illustrating the contents of the Control Register.

Turning next to FIGS. 5–15, the content and function of the various registers will be described. The Control register 23 is a read/write register that can always be read or written into by the user. Thus, the state of each of the bits in the Control register can be set by the user. As seen in FIG. 5, the Control register 23 includes a loop pause bit 41, a withhold connection bit 43 and an enable pseudo code comparison bit 45. In the described embodiment, these bits are located at positions D7, D6 and D4 respectively. The remaining bits D0–D3 and D5 are reserved (res) for other purposes.

When set, the loop pause bit 41 forces the State Machine to unconditionally pause in the Next state just after a programmed loop test is performed. The programmed loops may include the Link Confidence Test, the MAC loop test or any other programmed loop. On the other hand, when the loop pause bit 41 is not set, the Control register will not cause a pause at the end of the programmed loop. Thus, by setting the loop pause bit 41, the user can pause the PCM state machine after a loop has been executed in order to permit external user control (i.e. software control) of the remaining signalling sequence.

When the withhold connection bit 43 in the control register 23 is set, the state machine will go to the Break state from the Next state after all of the pseudo code bits have been exchanged. That is, when the withhold connection; bit 43 is set, it forces the connection to be withheld and the connection process to restart at the end of the Pseudo Code signalling. Thus, anytime that a reason to withhold the connection front being completed is detected, the withhold connection bit 43 in the control register 23 may be set, which might occur in the event of a neighboring station being replaced or reprogrammed to any other port type.

The enable pseudo code comparison bit 45 enables the PCM 20 to compare the pseudo code actually received to the expected values ,that are stored in the Receive registers 38 and 39. When the pseudo code comparison bit 45 is set, the PCM compares the received pseudo code to the values that are currently stored in the Receive registers 38 and 39. More particularly, when the pseudo code comparison bit is set, the value of the pseudo code bit actually received is compared to the value stored in the corresponding portion of the Receive registers. (Note that as explained below, the Receive registers have a bit that corresponds to each pseudo code bit). As long as the value received corresponds to the expected value stored in the receive register, the signalling sequence continues. On the other hand, if a mismatch occurs, the PCM state machine is paused, the pseudo code pause flag 53 is set, and the pause reason indicator 59 is set accordingly as:described below. When the enable pseudo code comparison bit 45 is not set, the PCM does not automatically check to insure that the received pseudo code information is equal to an expected value.

Figure 6:
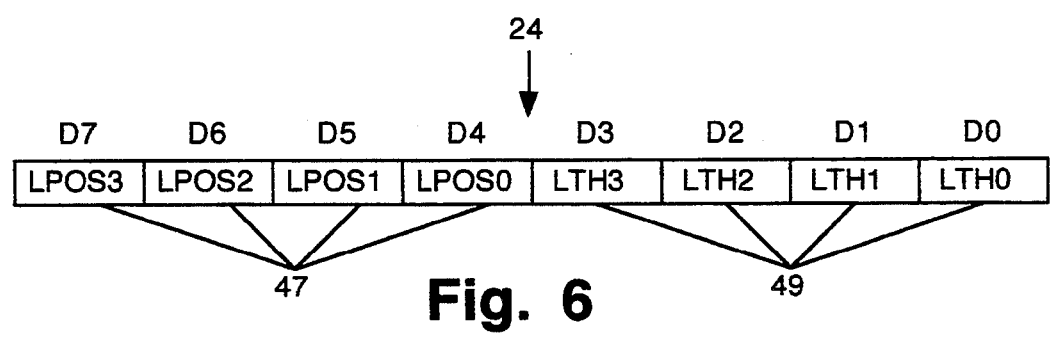
FIG. 6 is a diagram illustrating the contents of the Pseudo Code Register.

Turning next to FIG. 6, the Pseudo Code register 24 will be described. The Pseudo Code register 24 is a read/write register that can always be read or written into by the user. It includes a four bit loop position marker 47 and a four bit pseudo code length indicator 49. The loop position marker 47 specifies where in the pseudo code, a loop should be performed. For example, in the standardized FDDI-I protocol set forth in FIG. 2a, the link confidence test occurs after Bit 6 (the seventh bit since bit 0 is the first) of the pseudo code is transmitted, while the MAC loop test (if required) occurs alter Bit 8 (the ninth bit) of the pseudo code is transmitted. To signify the location of the MAC loop test in a standard protocol, the value eight would be loaded into the loop position marker 47. Since the user can freely write a value into the loop position marker 47, the user has complete control over the position at which loops occur relative to the pseudo code.

The pseudo code length indicator 49 indicates the index number of the last pseudo code bit to be transferred. Thus, the user has control over the length of the pseudo code. It is noted that the pseudo code length indicator 49 is a four bit value. Thus, the maximum length that can be counted by the pseudo code length indicator is sixteen bits (zero to fifteen). This value is chosen to correspond to the number of bits that can be stored in the Transmit and Receive registers, 35-39. Accordingly, as will be described in more detail below, in a single pass, a maximum pseudo code string of sixteen bits can be transmitted. However, during a pseudo code pause, the user can reload the Transmit registers 35,36 to provide additional pseudo code signalling information. At the same time, the pseudo code length indicator 49 and pseudo code index 61 can be reprogrammed to permit the transmission of additional pseudo code information. The reloading of the Transmit registers and the resetting of the pseudo code length indicator 49 can occur as often as necessary, thereby permitting the transmission of more than 16 bits of pseudo code information during the signalling sequence.

Figure 7:
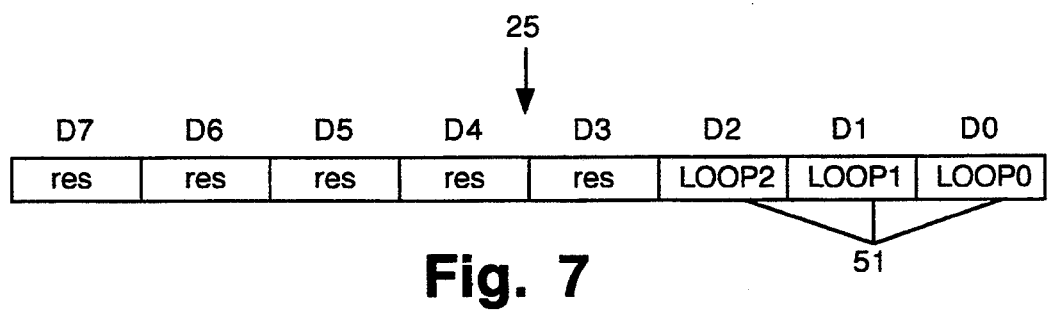
FIG. 7 is a diagram illustrating the contents of the Time Register.

Turning next to FIG. 7, the Time register 25 will be described. The Time register 25 is a read/write register that may be freely written into and read by the user. It includes a three bit loop duration indicator 51 which indicates the permitted duration of a pseudo code loop. The remaining bits within the Time register 25 are reserved for other uses. Loops whose duration can be limited by the loop duration indicator include the Link Confidence test, the MAC Loop test and any other loop test that may be required for a specific application. Since the loop duration indicator 51 is a three bit symbol, it can be used to represent eight preselected potential loop durations. Of course, the actual time values used can be widely varied.

By way of example, in one embodiment, the shortest potential loop duration (represented by a value 0,0,0 in the loop duration indicator 51) is 51.2 $\mu$sec. The longest fixed time (represented by value 1,1,0) is set at 53.69. The various loop duration indicator values in between these two potential loop duration values provide incremental increases in the loop duration of approximately an order of magnitude each. Finally, a "no time limit" option is provided (represented by value 1,1,1) which the user may utilize to eliminate hardware control of the pseudo code loop duration. In this case, the user would have to provide software based control of the loop duration.

Figure 8:
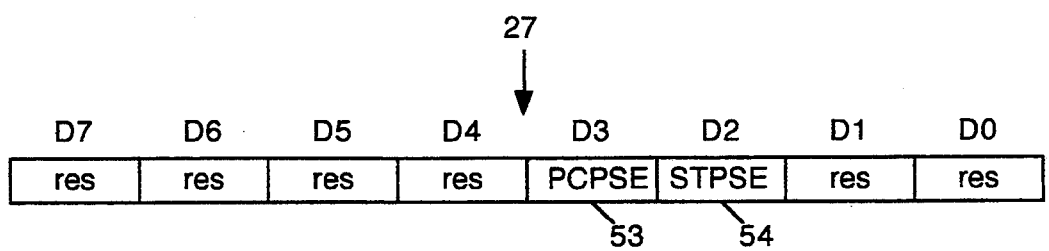
FIG. 8 is a diagram illustrating the contents of the Condition Register.

Referring next to FIG. 8, the Condition register 27 will be described. Bits in the Condition register 27 are flags that can always be read by the user. Bit D3 of the Condition register 27 is the pseudo code pause flag 53, (labeled PCPSE in the drawing). Bit D2 is the state pause flag 54 (labeled STPSE in the drawing). The remaining bits in the Condition register 27 are reserved to act as other flags.

The pseudo code pause flag 53 is set any time that the PCM state machine is paused in the Next state during the pseudo code signalling sequence. The state pause flag 54 is set any time that the state machine is paused due to a request from a state pause register (not shown) that the user may freely read and write into. The function of the state pause register is explained in more detail in the co-pending related application cited above. Each of these flags can be cleared by a PC_Continue signal.

Figure 9:
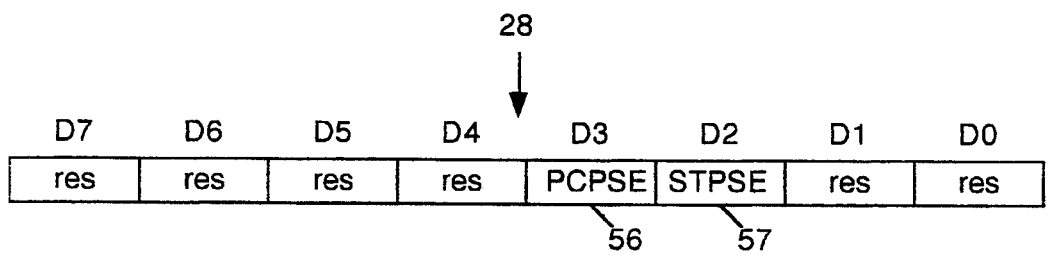
FIG. 9 is a diagram illustrating the contents of the Condition Mask Register.

The Condition Mask register 28 shown in FIG. 9 is closely related to the Condition register 27. Specifically, each bit in the Condition Mask register 28 has a corresponding bit in the Condition register 27. Thus, the Condition Mask register 28 includes a pseudo code pause mask 56 and a state pause mask 57. The Condition Mask register 28 is intended to facilitate the generation of interrupts. In operation, bits that are masked "off" (i.e. zeros) will not generate an interrupt, regardless of whether their corresponding bit in the Condition register 27 is set. On the other hand, bits that are masked "on" i.e. ones) will generate an interrupt anytime their corresponding bit in the Condition register 27 is set.

The user has complete freedom to read and write into the Condition Mask register 28. In this way, the user can decide which conditions they wish to be informed of. Thus, when the pseudo code pause mask 56 is set to zero, the user will not be informed of pseudo code pauses. On the other hand, if the pseudo code pause mask 56 is set to one, an interrupt will be generated anytime a pseudo code pause occurs. The user can then define the specific actions that are desired in response to the pseudo code pause. Of course such actions would typically be handled by application software. The state pause mask 57 functions in a similar manner.

Figure 10:
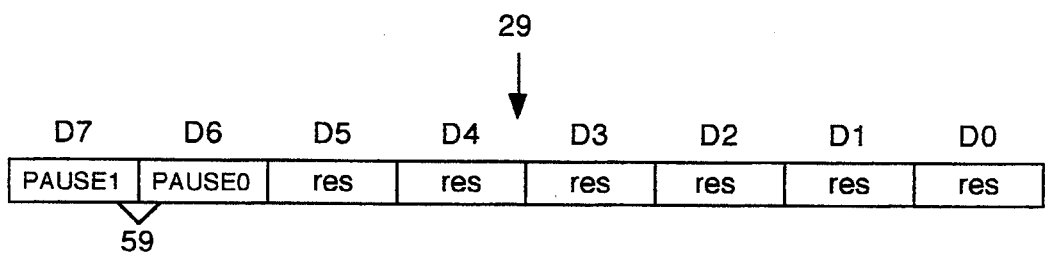
FIG. 10 is a diagram illustrating the contents of the Status Register.

Turning next to FIG. 10, the Status register 29 will be described. The Status register 29 is a read always register that provides general information about the status of the PCM. Bit D6 and D7 of the Status register 29 form a pause reason indicator 59 that indicates the reason for a pseudo code pause. There are a variety of potential causes of a pseudo code pause. One source of a pseudo code pause is a user requested pause that occurs due to a request from the Pseudo Code Pause register 33 as will be described in more detail below. A second source is a pause created by the detection of a mismatch between the pseudo code that is expected and that which is actually received. This type of pause is only created when the enable pseudo code comparison bit 45 in Control register 23 is set and a received pseudo code signal has a value that is different than the value of the corresponding bit in the Receive registers 38, 39. A third type of pause may occur when the user specifies a pause at the end of a loop. This is accomplished by setting the loop pause bit 41 in the Control register 23. Fourth, a pseudo code pause is generated any time that a failure occurs during the Link Confidence test. In the disclosed embodiment, a pause is generated whenever the error rate during the loop exceeds a programmable threshold.

Each of these pause initiation modes has a corresponding value within the pause reason indicator 59 that will be set when a pause occurs due to that reason. Thus, the user can determine the cause of any particular pause and can react accordingly. In the event that a pause is ordered due to two or more causes, the various causes are prioritized. In the disclosed embodiment, the prioritization order is that a mismatch is dominant over a simple pause request and a link confidence test failure is dominant over a loop end pause request. This is accomplished by using the value (0,0) to represent a simple pseudo code pause request, (0,1) to represent a received code mismatch, (1,0) to represent a loop end pause request, and (1,1) to represent a Link Confidence test failure.

Figure 11:
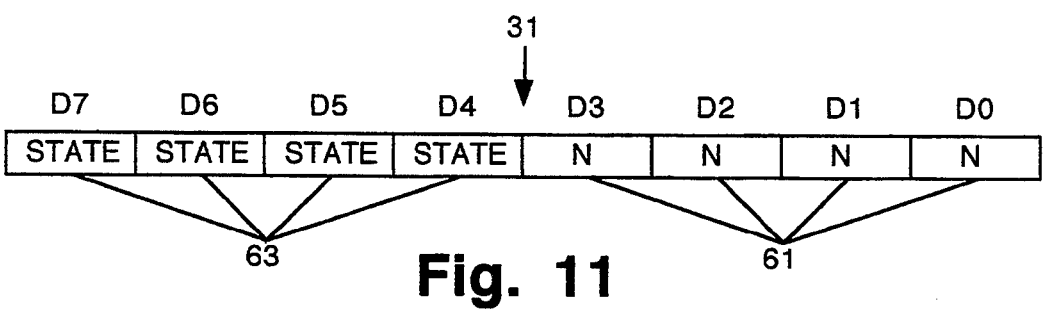
FIG. 11 is a diagram illustrating the contents of the State Register.

Turning next to FIG. 11, the State Register 31 will be described. The State register 31 indicates the current PCM condition. The first four bits of the State register (bits D0-D3) provide a pseudo code index 61. That is, they indicate the bit number of pseudo code signal that is currently being sent (the first bit is Bit 0). The remaining four bits of the State register (bits D4-D7) form a state index 63, which indicates the current PCM state. Within the state index, zero represents the "Off" state. One represents the "Break" state. Two represents the "Trace" state and three the "Connect" state. Four represents the "Next" state, five the "Signal" state, six the "Join" state, seven the "Verify" state and eight the "Active" state. Of course, if any additional states are desired, such as a maintenance state, they could be added as well.

One important feature of the State register is that it is a read/write register that can be read or written into by the user at any time. This permits the user to write a new state into the state index 63 and/or a new pseudo code bit number into the pseudo code index 61. When a new state value is written into the state index 63, the state machine will automatically transition to the new state and simultaneously clear any state pauses. Thus, writing a new state value in the state index 63 serves to force a state transition. In this way, the user can override the default connection management sequence logic and vary the PCM's connection management sequence.

When a new pseudo code value is written into the pseudo code index 61, then the next pseudo code signalling bit to be transmitted will be the value of the bit in the Transmit register 38,39 that is indicated by the pseudo code index. As will be described in more detail below, when this feature is combined with the ability of the user to pause the state machine, reset the loop position marker 47, reset the pseudo code length indicator 49 and to reload the Transmit registers 35, 36, it gives the user the ability to exercise complete control of the pseudo code, regardless of its length.

Figure 12:
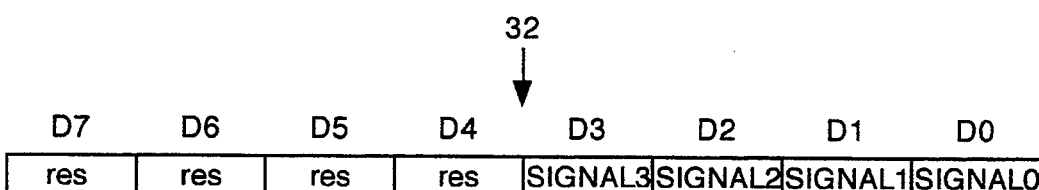
FIG. 12 is a diagram illustrating the contents of the Signal Register.

The contents of the Signal Register 32 are illustrated in FIG. 12. As seen therein, bits D0–D3 form a four bit PC_Signal symbol 65. When the PC_Signal symbol 65 is set to "zero", it represents a PC_Stop signal, which forces the state machine to the Off state. A "one" represents a PC_Start signal which forces the state machine to the Break state. A "two" represents a PC_Trace signal, which forces the state machine to the Trace state. It is noted, however, that the PC_Trace signal is only allowed when the machine is in the Active state. Finally, a "fifteen" represents a PC_Continue signal, which removes a pause condition, thereby allowing the state machine to proceed. The remaining numbers 3–14 are reserved and have no special meaning. Similarly, the remaining four bits of the Signal register 32 (i.e. bits D4–D7) are reserved.

Like the State Register 31, the Signal Register 32 is a read/write register that may always be written into by the user. This permits the user to insert a PC_Stop, a PC_Start, or a PC_Trace command at anytime. Further, by providing a user activated PC_Continue function, operation of the state machine may readily be resumed after a state or pseudo code pause.

The Pseudo Code Pause register may take the form of either a single sixteen bit register, or a pair of 8 bit registers 33,34 as shown in FIG. 13. The Pseudo Code Pause registers 33,34 allow the user to direct a pseudo code pause when the state machine enters the Next state after any particular one of the pseudo code bits has been transmitted. Each bit in the Pseudo Code Pause registers corresponds to a particular pseudo code bit. For example, bit D0 in the first Pseudo Code Pause register 33 corresponds to pseudo code bit zero (Bit 0). Therefore, if bit D0 is set to a "high" level (i.e. a logical "one"), a pause will be generated after the first pseudo code signal (Bit 0) has been sent. That is, when the state machine enters the Next state after the first pseudo code signal has been transmitted. On the other hand, if bit D0 is at a "low" level (i.e. a logical "zero"), the Pseudo Code Pause register will not cause a pause after the first pseudo code signal (bit 0) has been sent. Similarly, if bit D1 is set "high", a pause will be generated after the second pseudo code signal (Bit 1) is sent and so forth. In this manner, the user can pause the state machine after the transmission of any pseudo code bit.

Referring next to FIG. 14, the function and contents of the Transmit registers 35, 36 will be described. The Transmit registers 35, 36 are a pair of eight bit registers that contain the information to be transmitted during the pseudo code signalling. Alternatively, a single sixteen bit register or other sized registers could be used. Each bit of the Transmit registers corresponds to an index number (n) within the pseudo code index 61. Thus, the value T(n) stored within a bit D(n) of the transmit is the value of pseudo code signalling bit (n). Accordingly, when it comes time to transmit a pseudo code sisal bit (n), the PCM state machine transmits the value T(n) which is stored in bit D(n) of the Transmit register 35, 36.

The number of pseudo code bits transmitted is controlled by the pseudo code index 61 in conjunction with the pseudo code length indicator 49. Specifically, after each pseudo code bit has been transmitted, the PCM logic effectively checks to determine whether the value in the pseudo code index 61 is equal to the value in the pseudo code length indicator. If so, the pseudo code signalling is completed and if no pause or withhold connection has been requested, the PCM state machine moves to the join state as it continues with the connection management sequence. When the pseudo code index value is less than the value of the pseudo code length indicator, the pseudo code index is incremented and the next pseudo code signal (which is stored in Transmit registers 35 and 36) will be transmitted in due course.

The Transmit registers 35, 36 are read/write registers that may be freely read and written into by the user. Therefore, the user can program the entire anticipated pseudo code sequence into the Transmit registers before the pseudo code signaling sequence begins. Further, in the event that it becomes necessary to alter a particular pseudo code signal bit due to the receipt of an unexpected signal from the neighboring port or the desired sequence is more than 16 bits long, the Transmit register can be reloaded during a state pause to send the correct information. At the same time, it may be desirable to reset parameters within some of the other registers as previously discussed as well.

Finally, the function and contents of the Receive registers 38, 39 will be described with reference to FIG. 15. In essence, the Receive registers hold the expected pseudo code information which the PCM expects to receive from a remote station during the pseudo code signaling sequence. Like the Transmit registers 35, 36, the Receive registers 38, 39 are a pair of eight bit registers that can be combined into a single sixteen bit register. Each bit D(n) within the receive registers corresponds to a particular index number (n) in the pseudo code index 61. The value R(n) stored within each bit D(n) of the Receive register represents the value that the PCM expects to receive frown its neighboring port for the pseudo code signalling bit corresponding to index number (n).

The Receive register is used for comparison when the enable pseudo code comparison bit 45 in control register 23 is set. If a mismatch is detected in which a particular received pseudo code bit actually received A(n) does not match the expected value R(n) stored in the Receive register while the pseudo code comparison is enabled, a pause is initiated and processor intervention is requested to determine the appropriate actions and appropriate values for the remaining bits. The state machine is then only allowed to proceed after a PC_Continue signal is issued. As indicated above, this is accomplished by writing the value "fifteen" into the PC_Signal symbol 65 of the Signal register 32. After the comparison is performed (if enabled), the Receive register is updated to reflect the received bit stream.

Figure 16:
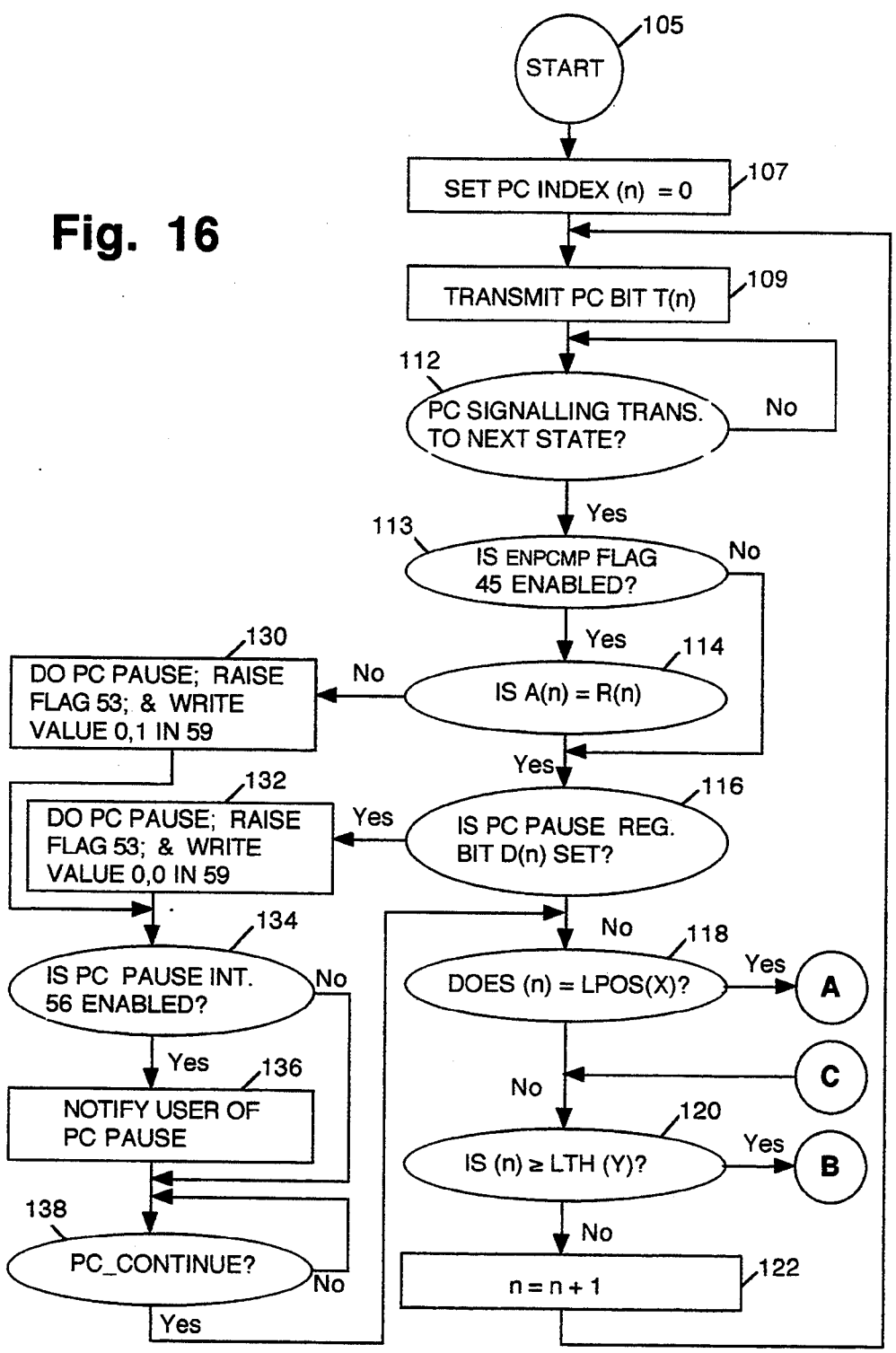
FIG. 16 is a flow diagram illustrating the process followed during the pseudo code transmission sequence.

Turning next to FIG. 16, a unique method of handling the pseudo code signalling portion of the connection management sequence which utilizes the described physical layer controller 10 will be explained. Under normal operating conditions, the neighboring port in the FDDI ring will be the same each time a connection is initiated. Therefore, one can typically predict the pseudo code information that will be received during any particular connection sequence. This is because the same port can be expected to maintain the same characteristics. When the pseudo code information robe received is known, then one can determine the pseudo code information to be transmitted. Therefore, in order to speed up the connection sequence, the PCM 20 includes Transmit registers 35,36 which store the pseudo code to be transmitted during the pseudo code signalling sequence. However, in most systems, there is a chance that the neighboring station may be reconfigured, a new station may be added to the ring and/or a station may be taken away from the ring. In such circumstances, there is a risk that the new neighbor will have different characteristics, which will be reflected in the pseudo code it transmits Therefore, it is important to check the incoming pseudo code to make sure it corresponds to the pseudo code that is expected. In the described embodiment, this is accomplished using a hardware approach through the use of Receive registers 38, 39.

Referring to FIG. 16, the general flow that occurs during the pseudo code signaling will be described. Initially, in step 105 the pseudo code signalling begins and in step 107, the pseudo code index 61 is set to zero. Then, in step 109, pseudo code signalling Bit (n) is transmitted. That pseudo code signal is stored as value T(n) within Transmit registers 35,36. In step 112, the PCM state machine waits for the completion of the transmission of signalling Bit (n), which is accomplished when the line state of the signal received from the neighboring station is detected allowing the PCM state machine to transition back to the Next state. When the Next state is detected, the PCM state machine checks to determine whether pseudo code comparison has been enabled, which is indicated by the enable pseudo code comparison flag 45 being set. If the enable pseudo code comparison flag 45 is set, then in step 114 the value of the pseudo code signal actually received from the neighbor A(n) is checked to determine whether it corresponds to its expected value R(n). If the pseudo code comparison flag 45 is not set, then the logic skips to step 116.

Assuming the pseudo code signal received is the expected value, the PCM state machine moves to step 116 where it checks to determine whether a pseudo code pause has been requested. This is done by checking the statics of bit D(n) in Pseudo Code Pause register 33. When the value of the pseudo code signal actually received from the neighbor A(n) does not correspond to its expected value R(n) a pseudo code pause is initiated and the logic flow moves to step 130 as described below.

When a pseudo code pause has not been requested in step 116, the PCM checks to determine whether the value (n) stored in the pseudo code index 61 is equal to a value stored in the loop position marker 47 (LPOS(X)). Step 118. If so, the loop is executed as the logic moves to the loop logic at A which is described below with reference to FIG. 17. If a loop is not to be performed, the logic moves to step 120, where it determines whether there is any additional pseudo code to be transmitted. This is accomplished by comparing the value (n) stored in the pseudo code index 61 to the value LTH(Y) stored in pseudo code length indicator 49. If the value (n) of the pseudo code index is greater than or equal to the value LTH(Y), then the pseudo code signalling sequence is completed and a PC_Join signal is transmitted so that the PCM state machine can transit to the Join state. This is represented by marker B in FIG. 16.

When there is some pseudo code remaining to be transmitted, the logic moves to step 122 where the pseudo code index 61 is incremented by one. Thereafter, the next pseudo code signalling bit is transmitted as the logic loops back to step 109.

When the value of the pseudo code signal actually received from the neighbor A(n) does not correspond to its expected value R(n) during the mismatch checking step 114 several actions occur. Step 130. Initially, a pseudo code pause is initiated and the pseudo code mismatch flag 53 is raised. Additionally, the value 0,1 is written into the pause reason indicator 59 in Status register 29. Thereafter, in step 134 a check is made to determine whether the user desires to be informed of the pseudo code pause via an interrupt. This is accomplished by checking to determine whether pseudo code pause mask 56 has been set. If so, the user is notified of the pseudo code pause in step 136. Thereafter, the logic waits for a PC_Continue signal in step 138. When the pseudo code pause mask 56 is not set, the logic skips straight to step 138. When a PC_Continue signal is received, the logic returns to step 118 to check for loops and such as described above.

When a pseudo code pause request has been detected in step 116, the logic moves to step 132 where a pseudo code pause is initiated. Additionally, the pseudo code pause flag 53 is raised and the value 0,0 is written into the pause reason indicator 59 in Status register 29. Thereafter the logic proceeds to step 134 and so forth as described above.

Figure 17:
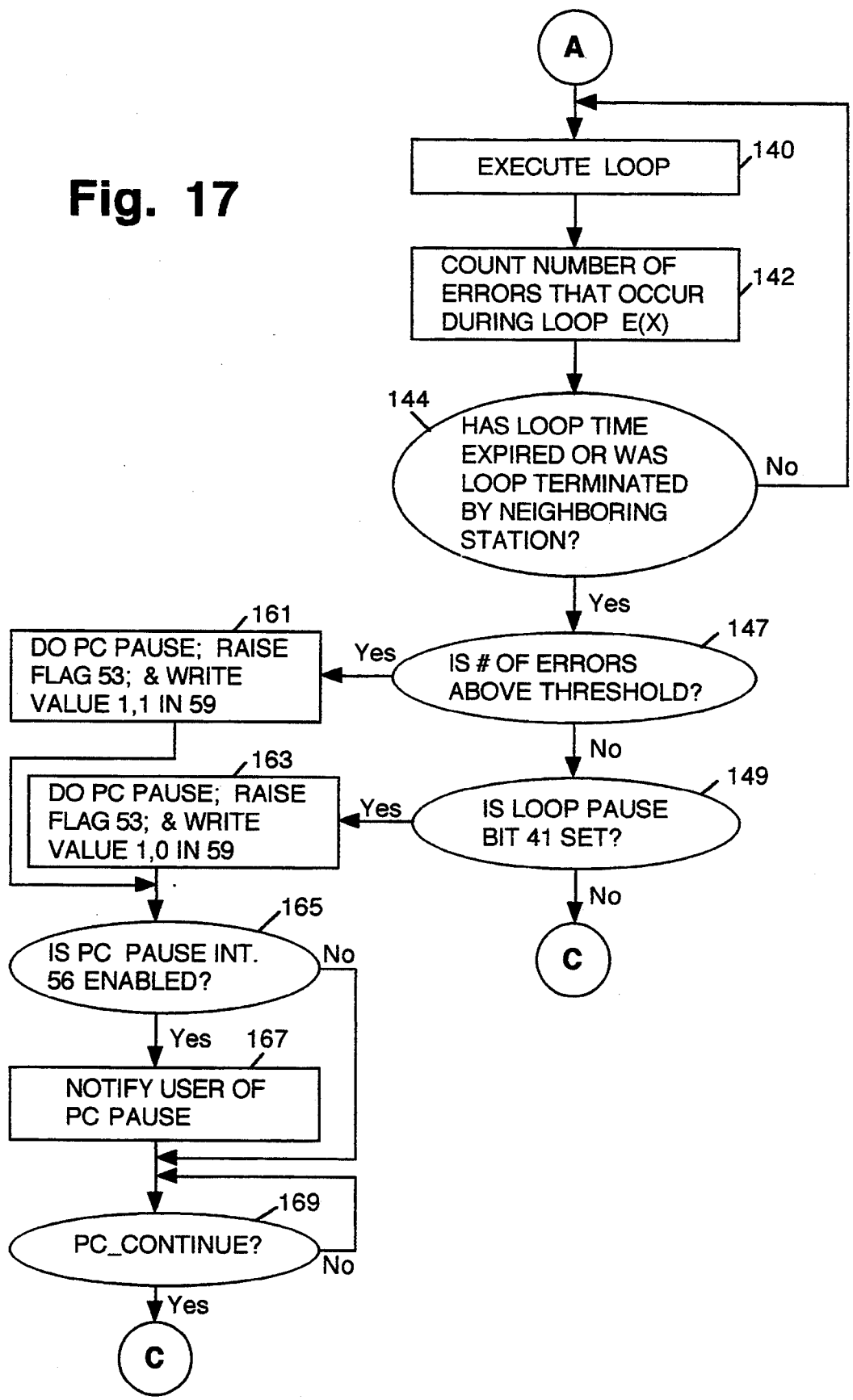
FIG. 17 is a flow diagram illustrating the process followed to execute a loop.

Referring next to FIG. 17, the pause logic as it relates to the loop features will be described. Once a loop is entered at point A, the designated loop is executed (step 140) for a designated period of time as determined by the value in loop duration indicator 51 in Time register 25 or until terminated by the neighboring station, whichever comes first. A termination by the neighboring station is indicated by the reception of a Halt or a Master line state. The number of errors E(x) that occur while the loop is being executed are counted in step 142. When the logic determines that the loop has terminated, it checks to see whether the number of errors is above an allowed threshold. Step 147. If so, a pseudo code pause is ordered and the flow of the logic moves to step 161 which is explained more fully below. On the other hand, if no errors are detected, or their number is below the threshold, the loop pause bit 41 is checked in step 149. If the loop pause bit is set, a pause has been requested at the end of the loop so a pseudo code pause is ordered and the logic moves to step 163. Otherwise, if the loop pause bit 41 is not set, the flow returns to step 120 to determine whether there are any additional pseudo code signalling bits to be transmitted.

When the number of detected errors is above the threshold, several actions occur. Step 161. Initially, a pseudo code pause is initiated and the pseudo code pause flag 53 is raised. Additionally, the value 1,1 is written into the pause reason indicator 59 in Status register 29. Thereafter, in step 165 a check is made to determine whether the user desires to be informed of the pseudo code pause via an interrupt. This is accomplished by checking to determine whether pseudo code pause mask 56 has been set. If so, the user is notified of the pseudo code pause in step 167. Thereafter, the logic waits for a PC_Continue signal in step 169. When the pseudo code pause mask 56 is not set, the logic skips straight to step 169. When a PC_Continue signal is received, the logic returns to step 120 to determine whether there are any additional pseudo code signalling bits to be exchanged.

When a pseudo code pause request has been detected in step 147, the logic moves to step 163 where a pseudo code pause is initiated. Additionally, the pseudo code pause flag 53 is raised and the value 1,0 is written into the pause reason indicator 59 in Status register 29. Thereafter the logic proceeds to step 165 and so forth as described above.

It is noted that to simplify this description these steps have been described as though they occur sequentially. However, in the actual logic, it is preferable to have the pause request checking, the pseudo code index comparison, the bit mismatch checking and the loop position marker checking steps occur simultaneously.

As indicated above, in the standard FDDI-1 connection sequence, ten bits of information are transmitted. Thus, the standard FDDI-1 connection management sequence can be handled by the described physical layer controller 10 without any software intervention since up to sixteen bits of information can be handled by the Transmit and Receive registers 35-39. However, the length of the pseudo code signalling is arbitrary, and is not restricted to sixteen bits. Rather, in the described embodiment, additional signalling can be performed using mid stream reprogramming, which would preferably take place during a pseudo code pause. Thus, the physical layer controller can be used to transmit a pseudo code signalling sequence of any length.

The length of the pseudo code signalling can be controlled by programming the pseudo code length indicator 49 in the pseudo code register 24 and the pseudo code index 61 in the state register 31. Specifically, to send more than sixteen bits of information, the various registers may be set to transmit a first section of the pseudo code sequence. Then the state machine is paused and the various registers are reset by the user to transmit the remainder (or a second section) of the pseudo code. By way of example, consider a pseudo code sequence having a total of twenty bits of pseudo code. The user may choose to transmit twelve bits of information in the first pass and the, n transfer the remaining eight bits in a second group. Of course, the transmission can be broken into any sized sequences that are convenient for the particular application and indeed could be broken into three or more sections if desired.

To transmit the original twelve bits of pseudo code, the transmit and receive registers 35,36 and 38,39 are loaded with the appropriate pseudo code information for the first twelve bits. The pseudo code length indicator 49 is set to "11" (which is the twelfth bit since "0" is the first). If a loop will occur within the first twelve bits, then the appropriate loop position is loaded into the loop position marker 47. Bit I11 in the pseudo code pause register 33 is then set to insure that a pause will occur after the twelfth bit is transmitted. The pseudo code index 61 is then set to zero and the pseudo code signalling within the connection management sequence may begin. With this configuration the first twelve bits of pseudo code information will be transmitted and then a pseudo code pause will occur.

While the state machine is paused, the user reprograms several of the registers to permit the transmission of the remaining eight bits of pseudo code. Specifically, the transmit and receive registers 35,36 and 38,39 would be loaded with the appropriate pseudo code information for the last eight bits. The pseudo code length indicator 49 is set to "7" (i.e. the eight bit) and the position of a loop (if any) is loaded into the loop position marker 47. The pseudo code index 61 is then reset to zero and the value "fifteen" (i.e. PC_Continue) is loaded into the PC_Signal symbol 65 in Signal register 32 which terminates the pause and permits the pseudo code signalling to continue.

Another important aspect of the described embodiment is the ability to pause the PCM state machine at various points within the pseudo code signalling process. A pseudo code pause is indicated by the pseudo code pause bit 53 being set in the condition register 27. The reason for the pause is then set forth in the pause reason bits 59 in the status register 29. There are four possible reasons for the pseudo code signalling to pause. First, the signalling can be paused after exchanging any specific bit by setting the appropriate bit(s) is the pseudo code pause register 33. In such cases, the state machine is paused just after entering the Next state which occurs right after transmitting the bit which had its corresponding pause bit set. Second, the signalling is paused anytime that mismatch checking is enabled and a mismatch is detected between the pseudo code bits actually received and those that are expected. Such mismatch checking only occurs when the enable pseudo code comparison bit 45 in control register 23 is set. When the enable pseudo code comparison bit 45 is not set, mismatch checking does not occur. When a mismatch is detected, the value R(n) in the Receive register 38, 39 is updated to reflect the value actually received. Thus, in future connections the PCM will expect to receive the new value of R(n). Of course, in alternative embodiments, the automatic updating feature could be eliminated or disabled.

The third source of pseudo code pauses is a pause generated at the end of a loop. This is accomplished by setting the loop pause bit 41 in the control register 23. In such cases, the state machine enters the paused condition in the Next state just after the end of the loop. The fourth source, is a pause generated when the link error rate exceeds a designated threshold. Thus, a mechanism is provided to enable the user to set any policy desired to handle errors that occur during the Link Confidence test.

There are two ways to release the state machine from a pseudo code pause. First, (and most commonly) a PC_Continue signal may be written into the signal index 65 of the signal register 32. The second approach is to force the state machine into a different state by writing a value into the state index 63 of the state register 31 or by writing a PC_Start or PC_Stop signal in the signal index 65. It is, however, contemplated that the later approach would only rarely be used to clear a pseudo code pause.

Providing complete hardware support for the Physical Connection Management as described herein and in the cited co-pending application relieves the station management software from the time critical connection management procedures. It also facilitates faster connections, which is very important for isochronous applications. Further, by not having much software involvement during the physical connection, processorless physical layer controller cards become feasible, which reduces costs.

It is noted that no attempt has been made to show a specific logic that implements the present invention since such logic can be readily fabricated by those skilled in the art. Although only one embodiment of the present invention has been described, it should be understood that the present invention may be embodied in many other specific forms without departing from the spirit or scope of the invention. For example, in the described embodiment, the length and arrangement of various indexes, markers and registers have all been described. However, these lengths and layouts may readily be varied to suit the needs of a particular system.

The physical layer controller in the described embodiment is part of an FDDI station. It should be understood that the term station in this context is not limited to work stations, but rather may also include concentrators and any other device that can be added as an active part of an FDDI based data transmission ring. Therefore, it should be apparent that the present examples are to be considered as illustrative and not restrictive, and the invention is not to be limited to the details given herein, but may be modified within the scope of the appended claims.

What is claimed is:

1. A physical layer controller for controlling a physical layer of a station that is capable of insertion into a data transmission network that is capable of operating substantially in accordance with a FDDI protocol, the physical layer controller including a physical connection management entity that is capable of executing a connection management sequence in accordance with the FDDI protocol, the connection management sequence including a pseudo code signaling sequence, the physical layer controller further comprising:

a plurality of registers, the registers including a state register that a user may selectively write into in order to designate a new pseudo code signaling bit that the physical layer controller should transmit, wherein when a value indicative of a desired new pseudo code signaling bit is written into the state register, the physical layer controller will automatically transmit the desired new pseudo code signaling bit as the next pseudo code signaling bit that is to be transmitted.

2. A physical layer controller as recited in claim 1 wherein the state register includes a pseudo code index that may be selectively written into in order to indicate a desired new pseudo code signaling bit number, the pseudo code index being arranged to indicate the bit number of the pseudo code signaling bit that is currently being transmitted, wherein when a value indicative of a desired new pseudo code signaling bit number is written into the pseudo code index, the physical layer controller will automatically transmit the desired new pseudo code signaling bit as the next pseudo code signaling bit that is to be transmitted.

3. A physical layer controller as recited in claim 1 wherein said plurality of registers further includes a pseudo code register that the user may selectively write into in order to indicate the length of the pseudo code signalling sequence.

4. A physical layer controller as recited in claim 3 wherein the pseudo code register includes a multibit length marker that may be selectively written into by the user, the length marker being arranged to store a value indicative of a last pseudo code signaling bit to be exchanged during a given portion of the pseudo code signaling sequence.

5. A physical layer controller as recited in claim 1 wherein said plurality of registers further includes a pseudo code register that the user may be selectively write into in order to indicate a position at which a loop test shall be performed relative to the pseudo code signaling sequence.

6. A physical layer controller as recited in claim 1 wherein said plurality of registers further includes a time register that the user may selectively write into in order to set a permitted duration of a loop test that is performed during the connection management sequence.

7. A physical layer controller as recited in claim 1 further comprising a PCM state machine, wherein said plurality of registers further includes a condition mask register having a pseudo code mask bit that enables the user to choose whether an interrupt should be generated when the PCM state machine is paused in a Next state during the pseudo code signaling sequence.

8. A physical layer controller as recited in claim 1 further comprising a PCM state machine, wherein said plurality of registers further includes a condition register having a pseudo code pause flag therein, the pseudo code pause flag being automatically set anytime that the PCM state machine is paused in a Next state during the pseudo code signaling sequence.

9. A physical layer controller as recited in claim 8 wherein said plurality of registers further includes:
a condition mask register having a pseudo code mask bit that enables the user to choose whether an interrupt should be generated when the PCM state machine is paused in the Next state during the pseudo code signaling sequence;
wherein when the pseudo code pause flag is raised while the pseudo code mask bit is set to a first level, an interrupt is generated; and
wherein when the pseudo code pause flag is raised while the pseudo code mask bit is set to a second level, an interrupt is not generated.

10. A physical layer controller as recited in claim 1 wherein said plurality of registers further includes a status register that may be read by the user, the status register including a pause reason indicator that indicates a reason for a pseudo code pause when the pseudo code signaling sequence is paused.

11. A physical layer controller as recited in claim 1 further comprising a PCM state machine, wherein said plurality of registers further includes a pseudo code pause register that may be selectively written into by the user the pseudo code pause register being arranged to indicate a location within the pseudo code signaling sequence that the PCM state machine should be paused in.

12. A physical layer controller as recited in claim 1 wherein said plurality of registers further includes a transmit register for storing a plurality of pseudo code signaling bits to be transmitted during the pseudo code signaling sequence, the transmit register being arranged such that the user may selectively write the desired pseudo code information into the transmit register.

13. A physical layer controller as recited in claim 1 wherein said plurality of registers further includes a receive register for storing a plurality of pseudo code signaling bits that the physical layer controller expects to receive during the connection management sequence from a neighboring port.

14. A physical layer controller for controlling the physical layer of a station that is capable of insertion into a data transmission network that is capable of operating substantially in accordance with a FDDI protocol, the physical layer controller including a physical connection management entity that includes a PCM state machine and is capable of executing a connection management sequence in accordance with the FDDI protocol, the connection management sequence having a pseudo code signaling sequence, the physical layer controller further comprising:

a plurality of registers, the registers including a pseudo code pause register that may be selectively written into by the user to indicate a location within the pseudo code signaling sequence that the PCM state machine should be paused in, wherein when the pseudo code signaling sequence reaches the pause location indicated by the pseudo code pause register, the PCM state machine will automatically pause in that location.

15. A physical layer controller as recited in claim 14 wherein the pseudo code pause register includes a plurality of pseudo code pause bits that a user may selectively set to a first or a second level, each pseudo code pause bit being associated with a particular pseudo code signaling bit, wherein when the PCM state machine enters a Next state after transmitting a pseudo code signaling bit associated with a pseudo code pause bit that is set to said first level, the PCM state machine will automatically pause in the Next state, and wherein when the PCM state machine enters the Next state after transmitting a pseudo code signaling bit associated with a pseudo code pause bit that is set to said second level, the PCM state machine will not automatically pause in the associated Next state.

16. A physical layer controller for controlling the physical layer of a station that is capable of insertion into a data transmission network that is capable of operating substantially in accordance with a FDDI protocol, the physical layer controller including a physical connection management entity that includes a PCM state machine and is capable of executing a connection management sequence in accordance with the FDDI protocol, the connection management sequence having a pseudo code signaling sequence, the physical layer controller further comprising:

a plurality of registers, the registers including,
a transmit register for storing a plurality of pseudo code signaling bits to be transmitted during the pseudo code signaling sequence, the transmit register being arranged such that the user may selectively write desired pseudo code information into the transmit register; and
a receive register that is arranged to store a plurality of pseudo code signaling bits that the physical layer controller expects to receive during the connection management sequence from a neighboring port; and
means for detecting a mismatch between the pseudo code signaling bits actually received from the neighboring port and the expected pseudo code signaling bits, wherein said mismatch detecting means may be selectively activated.

17. A physical layer controller as recited in claim 16 wherein the receive register is arranged such that when the mismatch detecting means is activated and a pseudo code signaling bit actually received from the neighboring port differs from the expected value, the receive register will be automatically updated to indicate the value actually received.

18. A physical layer controller for controlling the physical layer of a station that is capable of insertion into a data transmission network that is capable of operating substantially in accordance with a FDDI protocol, the physical layer controller including a physical connection management entity that includes a PCM state machine and is capable of executing a connection management sequence in accordance with the FDDI protocol, the physical layer controller further comprising:

a plurality of registers, the registers including a receive register that contains the pseudo code signaling bits that the physical layer controller expects to receive during the connection management sequence from a neighboring port; and
means for detecting a mismatch between the pseudo code signaling bits actually received from the neighboring port and the expected pseudo code signaling bits, wherein said mismatch detecting means may be selectively activated.

19. A physical layer controller as recited in claim 18 wherein the receive register is arranged such that when the mismatch detecting means is activated and a pseudo code signaling bit actually received from the neighboring port differs from the expected value, the receive register will be automatically updated to indicate the value actually received.

20. A physical layer controller for a station capable of insertion into a data transmission network that is capable of operating substantially in compliance with a FDDI protocol, the physical layer controller including a physical connection management entity comprising:

hardware based transmit code means for storing pseudo code signaling bits expected to be transmitted during a connection management sequence; and
hardware based means for storing pseudo code signaling bits that are expected to be received from a neighboring port during the connection management sequence; and
hardware based means for comparing the pseudo code signaling bits that are actually received from a neighboring port during the connection management sequence to the expected pseudo code signaling bits and requesting user intervention in the event that the actual pseudo code signaling bits received do not correspond to the expected pseudo code signaling bits.

21. A physical layer controller as recited in claim 20 wherein the transmit code storing means includes a transmit register that contains the bits to be transmitted during the connection management sequence, the transmit register being arranged such that the user may selectively write the desired pseudo code information into the transmit register.

22. A physical layer controller as recited in claim 21 further comprising a receive register that contains the expected pseudo code signaling bits.

23. A method of initializing the connection between two stations in a data transmission network that operates substantially in compliance with an FDDI protocol, the method comprising the steps of:
   (a) transmitting a pseudo code signaling bit to an adjoining station;
   (b) receiving a corresponding pseudo code signaling bit from the adjoining station;
   (c) comparing the value of the received signaling bit to an expected value for that pseudo code signaling bit, whereby when the actual value of the pseudo code signal bit received does not correspond to the expected value, a pseudo code pause is initiated and a request is made for assistance from user software;
   (d) checking to determine whether additional pseudo code signal bits are to be exchanged; and
   (e) repeating steps (a)–(d) until all of the pseudo code signaling bits have been exchanged.

24. A method as recited in claim 23 further comprising the step of:
   (f) checking to determine whether a pseudo code pause has been requested by the user after the transmission of each pseudo code signaling bit, wherein when a pseudo code pause has been requested a pause is executed while a PCM state machine is in a Next state that is used to separate pseudo code signaling bits.

25. A method as recited in claim 24 wherein when a pseudo code pause is initiated, the method further comprises the steps of:
   (g) raising a pseudo code pause flag; and
   (h) writing a value into a pause reason indicator portion of a status register that is indicative of cause of the pseudo code pause.

26. A method as recited in claim 23 further comprising the steps of:
   (i) checking after a particular pseudo code signaling bit has been transmitted to determine whether a loop test is to be executed before the transmission of the next pseudo code signaling bit in a pseudo code signaling sequence; and
   (j) executing the loop test when a loop test is called for.

27. A method as recited in claim 26 wherein when a loop test is executed, the method further comprises the steps of:
   (k) checking to determine whether the number errors that occurred during the execution of the loop test exceeds a given threshold; and
   (l) initiating a pseudo code pause after the loop test is completed anytime that the error threshold is exceeded during the execution of the loop test.

28. A method as recited in claim 27 further wherein when a loop test is executed, the method further comprises the steps of:
   (m) checking to determine whether a pseudo code pause has been requested by the user after the completion of the loop test; and
   (n) initiating a pseudo code pause after the loop test is completed anytime such a pseudo code pause has been requested.

29. A method as recited in claim 28 wherein when a pseudo code pause is initiated, the method further comprises the steps of:
   (g) raising a pseudo code pause flag; and
   (h) writing a value into a pause reason indicator portion of a status register that is indicative of cause of the pseudo code pause.

30. A physical layer controller as recited in claim 2 wherein the pseudo code index is located in the state register.

* * * * *

UNITED STATES PATENT AND TRADEMARK OFFICE
CERTIFICATE OF CORRECTION

PATENT NO. : 5,390,183
DATED : February 14, 1995
INVENTOR(S) : Friedrich et al.

It is certified that error appears in the above-indentified patent and that said Letters Patent is hereby corrected as shown below:

```
Title Page, [57] Abstract, line 13, change "Complete" to --complete--
Column 1, line 9, change "referent" to --reference--
Column 1, line 10, after "1." delete "I."
Column 1, line 39, after "JK") replace the "." with a --,--
Column 2, line 43, change "he" to --the--
Column 3, line 53, change "he" to --the--
Column 6, line 18, before "determines" delete ";"
Column 8, line 14, after "connection" delete ";"
Column 8, line 17, change "front" to --from--
Column 8, line 24, before "that" delete ","
Column 8, line 39, after "as" delete ":"
Column 12, line 16, change "sisal" to --signal--
Column 12, line 60, change "frown" to --from--
Column 13, line 20, change "robe" to --to be--
Column 13, line 63, change "statics" to --status--
Column 15, line 60, change "the,n" to --then--
Column 18, line 65, insert --,-- after "user"
```

Signed and Sealed this

Sixteenth Day of April, 1996

Attest:

BRUCE LEHMAN

*Attesting Officer*  *Commissioner of Patents and Trademarks*